United States Patent [19]
Parsons et al.

[11] Patent Number: 5,359,839
[45] Date of Patent: Nov. 1, 1994

[54] TOOTHBAR RELEASE FOR HARVESTER HEADER REEL

[75] Inventors: Stephen K. Parsons; Craig A. Richardson, both of Ottumwa, Iowa

[73] Assignee: Deere & Company, Moline, Ill.

[21] Appl. No.: 93,426

[22] Filed: Jul. 19, 1993

[51] Int. Cl.⁵ ............................................. A01D 57/03
[52] U.S. Cl. ..................................... 56/130; 56/364; 460/122
[58] Field of Search ................. 56/298, 364, 300, 301, 56/119, 128, 130; 460/121, 122

[56] References Cited
U.S. PATENT DOCUMENTS 3,224,177 12/1965 Adee .
3,375,643 4/1968 McCarty et al. .
3,766,725 10/1973 Marsh ..................................... 56/364
4,300,337 11/1981 Sharp ................................... 56/364 X
4,353,201 10/1982 Pierce et al. ......................... 56/130 X Primary Examiner—Terry Lee Melius

[57] ABSTRACT

A mower conditioner header has a reel which includes a plurality of rotatably mounted toothbars each carrying teeth. The toothbars are controlled during rotation of the reel so that they rock to maintain the teeth at the desired attitude relative to the crop as it is swept across a cutterbar of the harvester to be cut and then on the nip of conditioner rolls. This control of the toothbars is done by toothbar guide arms fixed to an end of each toothbar, the arms each carrying a roller which is received in an upright D-shaped cam track carried by an adjacent one of opposite side structures of the frame of the header. To permit at least one toothbar to be rotated so as to swing its associated teeth away from the vicinity of the cutterbar for permitting access for performing service on the cutterbar, the toothbar guide arm associated with this toothbar is made of inner and outer arm sections which are mounted for relative pivotal movement but which are held together for movement in unison by a selectively releasable latch pin.

9 Claims, 5 Drawing Sheets

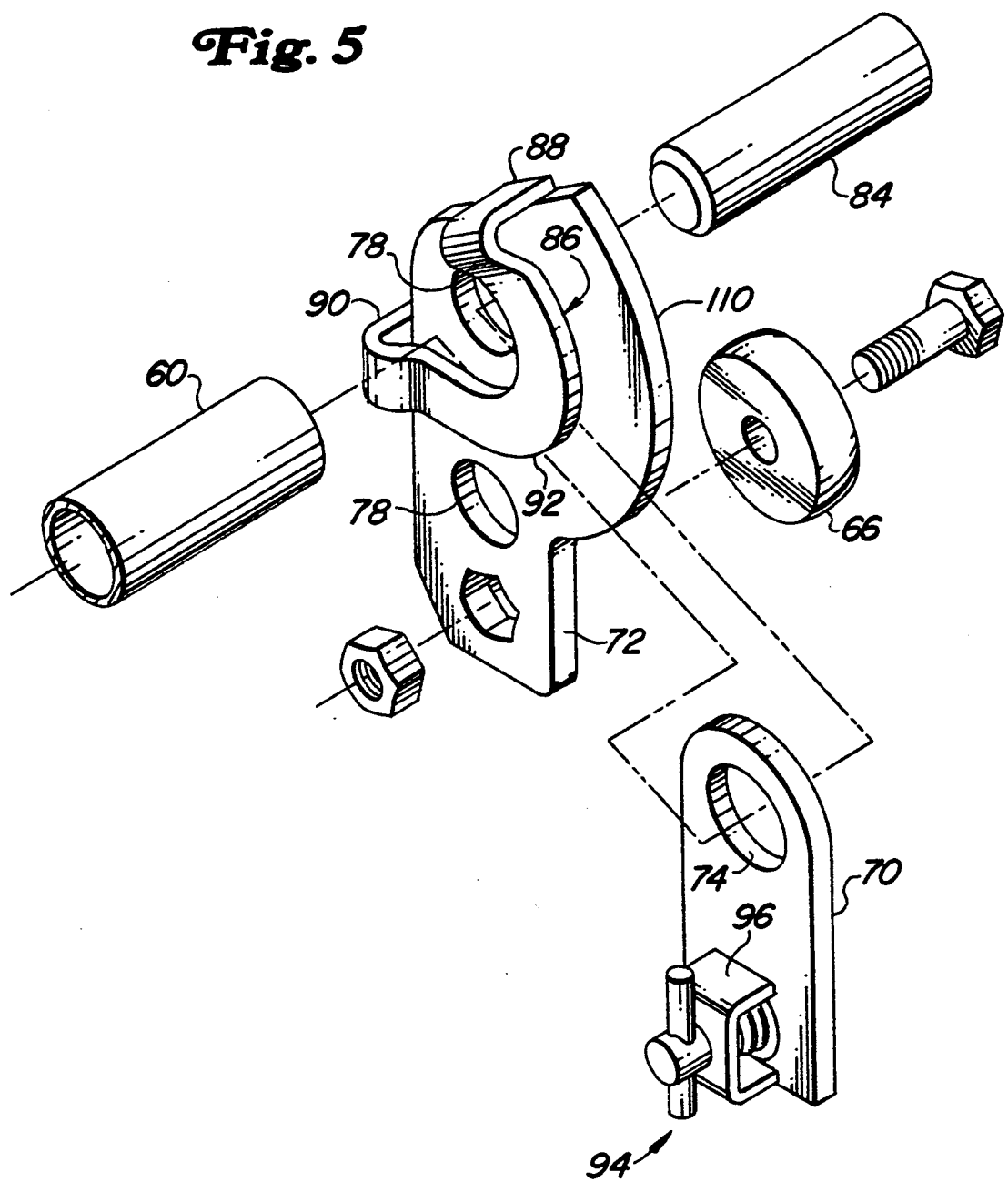

TOOTHBAR RELEASE FOR HARVESTER HEADER REEL

BACKGROUND OF THE INVENTION

The present invention relates to crop harvester headers and more specifically relates to reels for such headers.

Harvesters, such as sickle mower conditioners, for example, which use a sickle to sever the crop from the ground, use a reel to feed crop through the machine. These reels normally include a plurality of spider structures spaced across the length of the reel and supporting toothbars or pipes for oscillation at the ends of the legs of the spiders, the spiders themselves being mounted to a support axle that extends between and has its opposite ends rotatably received in bearing structures mounted to opposite side structures of the header. The axle of the reel is driven so that the teeth act to sweep standing crop across the cutterbar to be severed and then to sweep the cut crop into other devices which act to continue the flow of crop through the header. To keep the teeth in the proper orientation for sweeping first the standing and then cut crop, a first end of a toothbar guide arm is fixed to an end of each toothbar with a second end of the arm carrying a roller which is received in a somewhat D-shaped cam track mounted to the adjacent header side structure.

Mower conditioners are subject to frequent cutterbar damage due to rocks and other obstructions. Minor repair to this area of the machine is a frequent and routine part of normal operation. However, the teeth on the reel obstruct easy access to the cutterbar components when repair or adjustment is required and the arm and cam structure for guiding the teeth for properly feeding the crop prevent them from being moved out of the way.

SUMMARY OF THE INVENTION

According to the present invention there is provided an improved reel construction and more particularly there is provided an improved guide arm for the reel toothbar.

An object of the invention is to provid a reel construction which allows the teeth to be moved out of the way to permit easy access to the cutterbar area of a crop header equipped with a sickle mower so that service to the guards, hold downs and sickle sections may be performed.

A more specific object of the invention is to provide a reel construction as set forth in the previous object wherein at least one toothbar guide arm comprises inner and outer arm sections releasably latched together for movement in unison during normal mowing operation while permitting the inner arm section together with the toothbar to be pivoted relative to the outer arm section when the latch is disengaged thereby resulting in the teeth carried by the toothbar being rotated away from the cutterbar area for permitting service in that area when desired.

Yet a more specific object of the invention is to provide a two-section arm as set forth in the immediately preceding object wherein the inner and outer arm sections are connected together by a spring-loaded latch pin assembly carried by the inner arm section and being operable between an extended latch position, wherein it is received in a hole in the outer arm section for causing the arm sections to act as one, and a retracted unlatch position wherein the inner arm section together with the toothbar is pivotable relative to the outer arm section.

Still another object of the invention is to provide a two-section arm as set forth in the immediately preceding object wherein the outer arm is shaped for retaining the latch pin in its retracted position so long as the inner arm section is pivoted relative to the outer arm section, with the latch pin automatically re-entering the hole in the outer arm section once the inner and outer arm sections resume a normal working position relative to each other.

A further object of the invention is to provide a two-section, toothbar guide arm wherein the outer section carrying the cam roller includes an integral strap which receives the inner arm section before the latter is welded to the toothbar and after such welding takes place acts to limit outward movement of the outer arm section to prevent the mounting pin thereof from becoming separated from the toothbar.

These and other objects will become apparent from a reading of the ensuing description together with the appended drawings.

BRIEF DESCRIPTION OF THE DRAWINGS

FIG. 5 is an isometric exploded view of the toothbar guide arm showing how the latter is assembled in order that the retainer strap of the outer arm section can serve to prevent the mounting pin of the latter from moving outwardly relative to, and, thus from becoming disengaged from the toothbar.

DESCRIPTION OF THE PREFERRED EMBODIMENT

Figure 1:
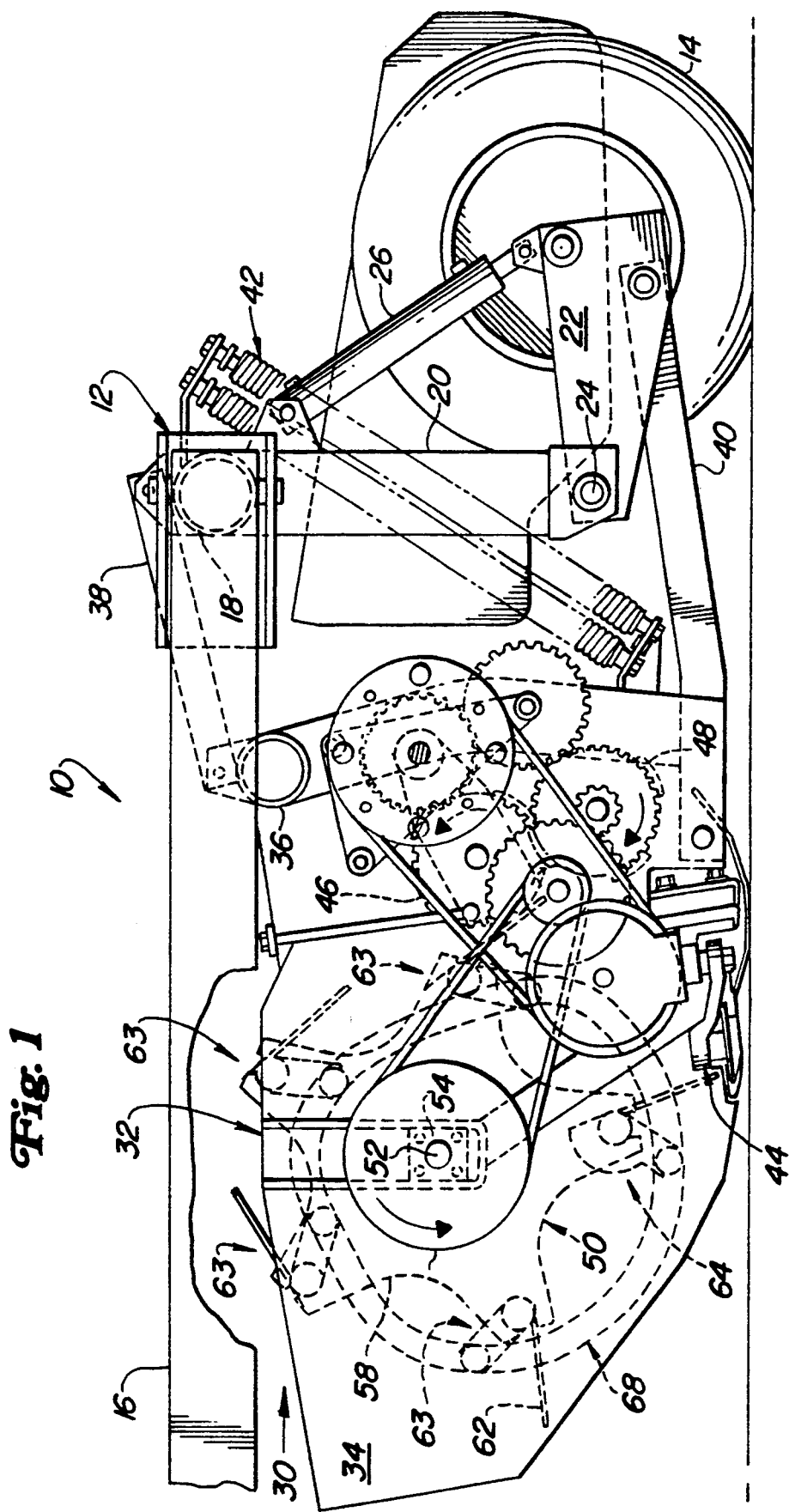
FIG. 1 is a left side elevational view of a sickle mower conditioner with which the present invention is particularly adapted for use.

Referring now to FIG. 1, there is shown a crop harvesting implement configured as a mower conditioner 10 having a main frame 12 supported on a pair of ground wheels 14 (only one shown) and having a draft tongue 16 pivotally mounted to a left end of a horizontal cross frame member 18. The pair of ground wheels 14 are each connected to a respective wheel support leg 20 depending from opposite end locations of the cross frame member 18. Specifically, each leg 20 has the forward end of a wheel support arm 22 pivotally coupled, as at 24, to the bottom thereof, with a spindle being mounted to a rear portion of each arm and having a respective one of the wheels 14 mounted thereon. Connected between the adjacent ones of the legs 20 and wheel arms 22 is a hydraulic cylinder 26 which is operable for moving the frame 16 between a raised transport and lowered working positions.

A header or platform 30 comprises a frame 32 including opposite, upright parallel side structures 34 joined together at an upper rear location by a tubular cross frame member 36. The header 30 is supported from the frame 12 by a linkage including an upper link 38 located centrally between the side structures 34 and having its forward end pivotally coupled to a lug fixed to the cross frame member 36 and having its rear end pivotally coupled to a lug fixed to the main frame cross frame member 18. The four bar linkage further includes a pair of parallel lower links 40 having their rear ends respectively pivotally connected to the pair of wheel arms 22 and having their forward ends respectively pivotally connected to lower rear locations of the side structures 34. Located on each side of the mower conditioner and interposed between the main frame 12 and the four bar linkage is a float spring assembly 42 which acts to counterbalance the weight of the header so that it "floats" over the ground during mowing operation.

Figure 2:
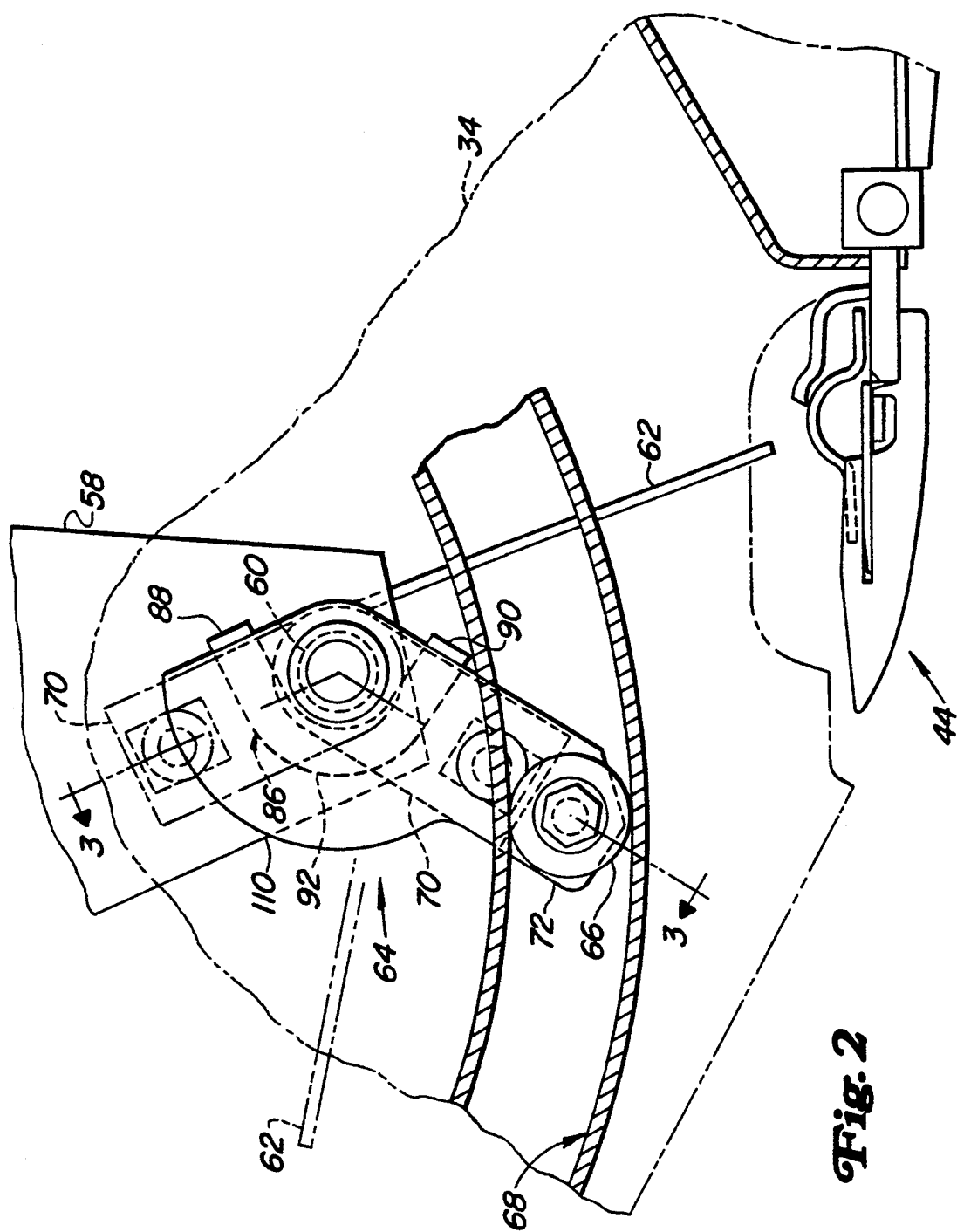
FIG. 2 is a left side elevational view showing the toothbar guide arm of the present invention and its associated toothbar in a solid line working position with the tines sweeping across the cutterbar, the left-hand header side structure being shown in phantom and the inner toothbar guide arm section being shown pivoted to a dashed line service position wherein the associated tines are swung away from the cutterbar to provide access for servicing components of the cutterbar.

A sickle mower cutterbar 44 of conventional construction is mounted between the side structures 34 at locations just forwardly of the connections with the lower suspension links 40. The cutterbar 44 includes the usual guards, hold down clips and sickle sections which require relatively frequent servicing, including replacement of guards and/or sickle sections and adjustment of the hold down clips. Provided for sweeping standing crop across the cutterbar 44 for aiding in the cutting process and then for feeding the cut crop into the nip of upper and lower conditioning rolls 46 and 48, extending between and mounted to the side structures 34, is a reel 50. Specifically, referring now also to FIGS. 2, it can be seen that the reel 50 includes a central reel axle 52 having its opposite ends rotatably mounted in bearing assemblies 54 that are secured in slots 56 provided in and extending downwardly from the tops of the side structures 34. The reel 50 further includes a plurality of transversely spaced spiders 58 keyed for rotation with the axle 52. Each spider 58 is in the shape of a five point star with each point carrying a bearing assembly forming a pivotal mounting for a toothbar 60. Thus, the reel 50 has five toothbars 60 arranged equiangularly about the axle 52. Mounted at equispaced locations along each toothbar 60 is a plurality of reel teeth 62, each tooth either forming part of a double tooth assembly, wherein a pair of teeth have interconnected coils received about and secured to the toothbar, or forming part of a single tooth assembly wherein the tooth is associated with a single coil received on and fixed to the toothbar. In any event, although the teeth 62 may flex relative to their associated toothbar 60, they are prevented from rotating relative to the toothbar. As can best be seen in FIG. 1, the angular relationship of the teeth mounted on a given toothbar 60 relative to the axle 52 is different for each toothbar, the orientation of the set of teeth carried by a given toothbar being that which is the best for transporting the crop rearwardly in the header 30. For the purpose of maintaining the correct angular disposition of the teeth 62 on a given toothbar 60 as the reel 50 rotates, the left-hand end of each toothbar 60 has a guide arm fixed thereto, with all but one of the guide arms (that shown positioned for sweeping crop against the cutterbar 44) being of a single-piece, conventional construction and designated by the reference numeral 63 while the remaining guide arm is made in accordance with the present invention and designated by the reference numeral 64. While one of the arms 64 could be mounted to each of the toothbars 60, only one is used for the sake of economy. The arms 63 and 64 extend radially from their associated toothbar 60 and each has a roller 66 mounted in the end thereof and received in a D-shaped cam track 68 defined by an inwardly opening channel member mounted to the inside of the left-hand side structure 34 and being disposed such that the straight part of the D is located rearwardly of the cutterbar 44 and is inclined slightly forwardly from the vertical. To this point the description is that of a header having a conventional reel. The inventive subject matter follows.

Figure 3:
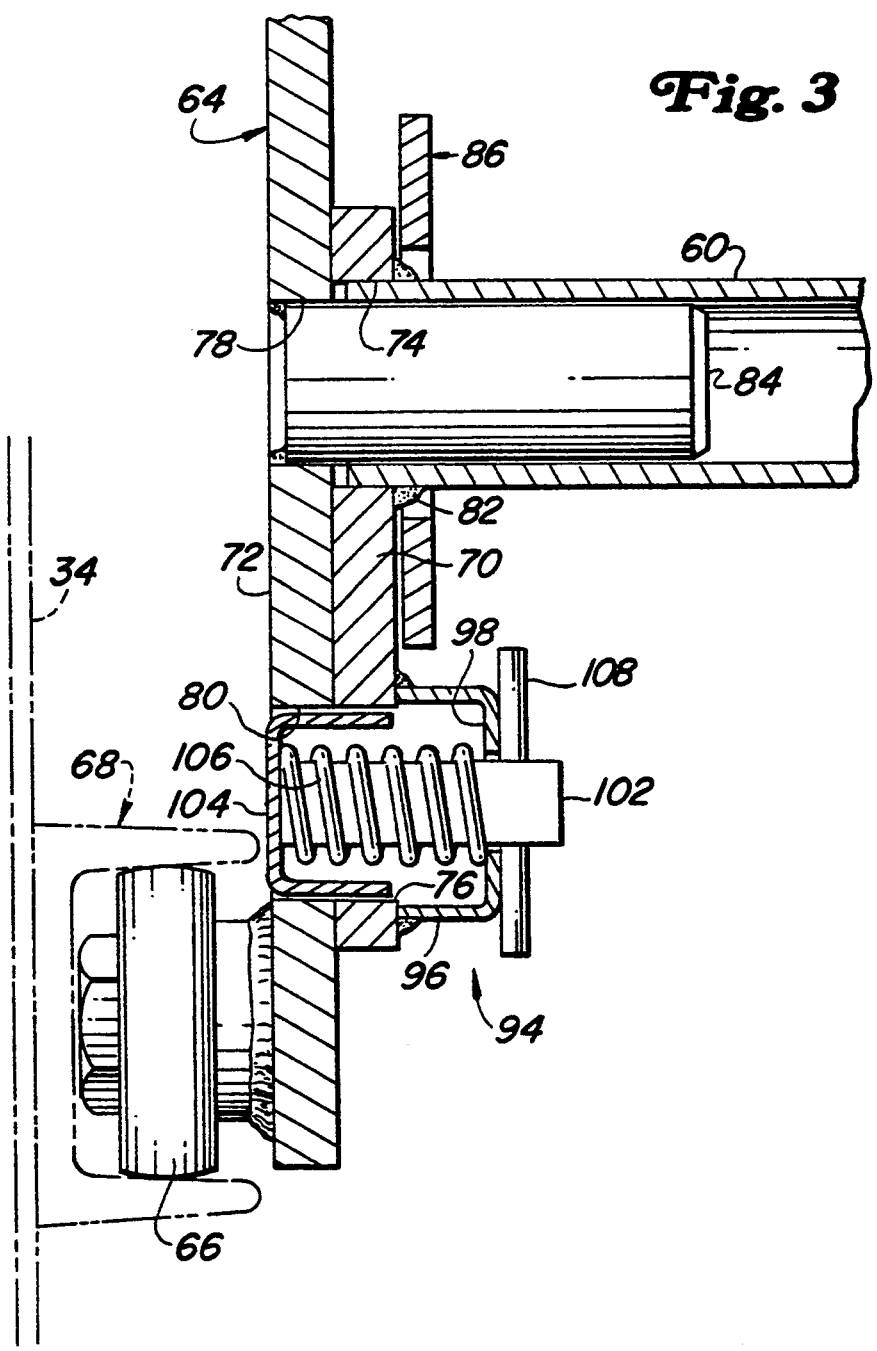
FIG. 3 is a sectional view taken along line 3—3 in FIG. 2 but with the teeth removed for the sake of simplicity.
Figure 4:
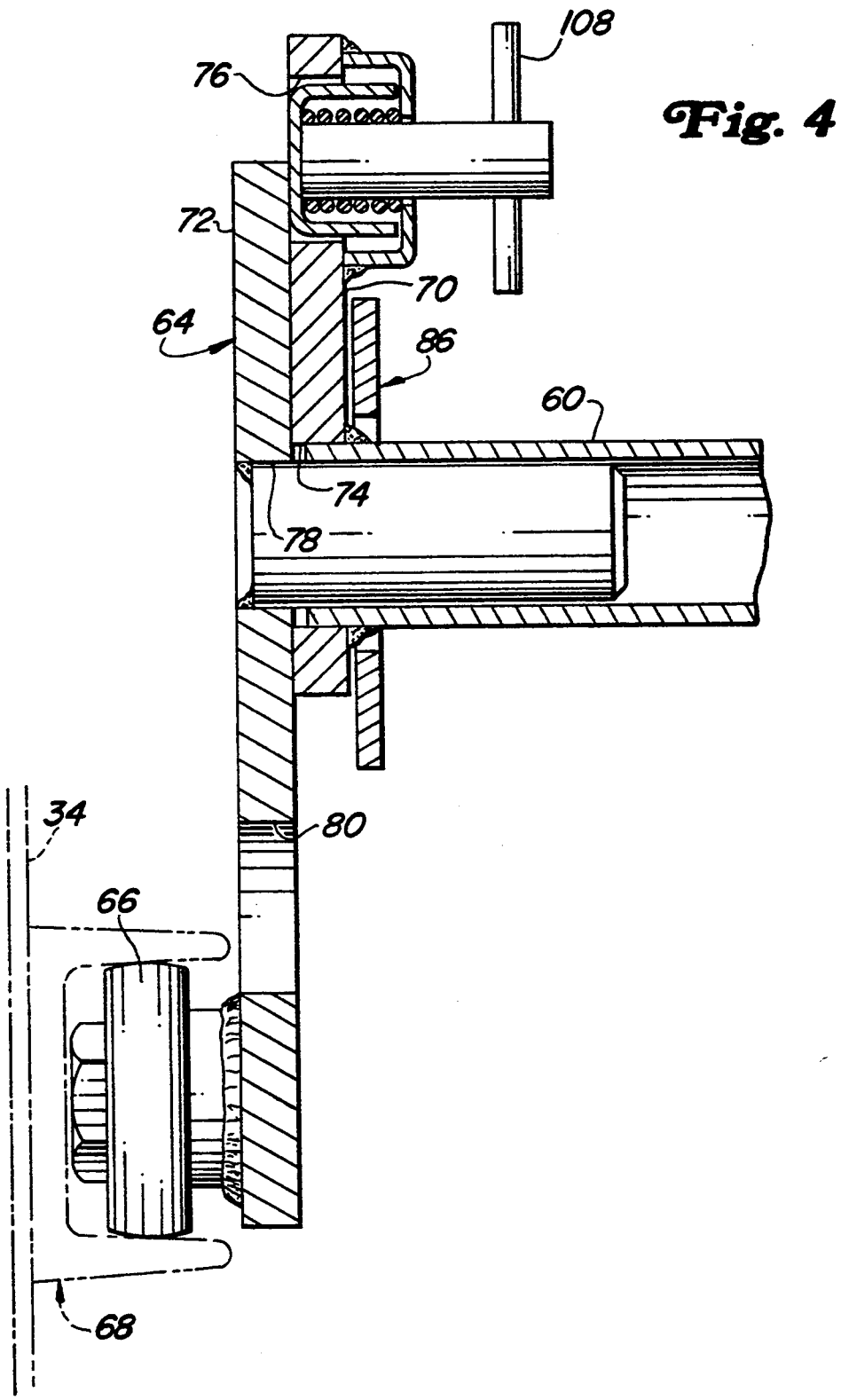
FIG. 4 is a sectional view like FIG. 3 but showing the latch pin removed from the outer arm section and the inner arm section and associated toothbar being rotated to the service position.

Referring now also to FIGS. 3–5, it can be seen that the toothbar guide arm 64 comprises inner and outer arm sections 70 and 72, respectively. The inner arm section 70 has first and second holes 74 and 76, respectively, provided in opposite ends thereof and the outer arm section 72 similarly has first and second holes 78 and 80, respectively, provided at spaced locations thereof. The first holes 74 and 78 in the respective arm sections 70 and 72 are axially aligned with each other, with the outer end of the toothbar 60 being received in the inner arm first hole 74 and welded in place by an annular bead of weld material 82 located on the inside of inner arm section while a mounting pin 84 has an outer end received in the first hole 78 of and is welded to the outer arm section 72. The pin 84 projects through the first hole 74 in the inner arm section 66 and is pivotally received within an outer end portion of the toothbar 60. The outer arm section 72 includes a retainer strap 86 having, as can best be seen in FIG. 5, upper and lower end portions 88 and 90 which extend parallel to the axis of the toothbar 60 and are welded to spaced locations on the leading edge of the outer arm section, as considered in its direction of movement during normal operation. Extending parallel to and being in inwardly spaced relationship to the remainder of the outer arm section 72 is an intermediate strap portion 92 which is joined to the strap end portions 88 and 90. Thus the retainer strap 86 together with the remainder of the arm section 72 forms a pocket or slot and received in this pocket is the upper end of the inner arm section 70, the retainer strap acting to prevent outward movement of the outer arm section 72 and hence withdrawal of the mounting pin 84 from the toothbar 60 once the guide arm 64 is assembled by (a) inserting the inner arm section 70 into the pocket, (b) inserting the pin 84 through the first arm section holes 78 and 74 and into the toothbar 60 while sliding the inner arm section 70 onto the toothbar 60 and then (c) welding the pin 84 to the outer arm section 72 and welding the inner arm section 70 to the toothbar 60.

Associated with the second hole 76 in the inner arm section 70 is a spring-loaded latch pin assembly 94 comprising a U-shaped bracket 96 having its legs welded to the inside of the inner arm section 70 with the legs spaced equidistant from the axis of the hole 76 so that the bracket bridges the hole with a web 90 of the bracket being spaced inwardly from the hole. A latch pin 100 is defined by a stem 102 and a cylindrical cup 104, the stem 102 projecting through a hole provided in the web 98 in axial alignment with the arm section hole 76 and the cup 104 receiving and having an inner end of the stem 102 welded to its bottom. When the arm 64 is in a normal working condition, as shown in FIG. 3, the cup 104 is snugly but slidably received in the second holes 76 and 80, respectively, of the inner and outer arm sections 70 and 72 so that the arm sections move in unison. A coil compression spring 106 is received on the stem 102 between the cup bottom and the bracket web 98 and acts to resiliently resist inward movement of the latch pin cup 104 from its location within the hole 80 in the outer arm section 72. It will be appreciated that the pin stem 102 and cup 104 cooperate with the bracket 96 to form a latch assembly which is endwise compact. A roll pin 108 is pressed into a cross hole provided in the stem 102 at a location inwardly of the bracket web 98, the roll pin serving as a handle for permitting the latch pin 100 to be manually moved to an inwardly displaced release position as illustrated in FIG. 4.

When the latch pin 100 of the arm 64 is in its retracted or release position, the inner arm section 70 of the toothbar arm 64 together with the associated toothbar 60 may be pivoted about the pin 84 located in the end of the toothbar. In this way the teeth 62 associated with the toothbar may be swung away from the cutterbar 44 to provide access for service to the toothbar. For the purpose of keeping the latch pin 100 in its retracted or release position when the pin is misaligned with the hole 80 of the outer arm section 72, the outer arm section includes an arcuate portion 110 (FIGS. 2 and 5) having an outer dimension located at a radius from the mounting pin 84 which is equal to the distance the release pin 100 is from the pin 84 so that bottom of the release pin cup 104 remains in engagement with the arm section portion 110 throughout the range of pivotal motion of the inner arm section 70 relative to the outer arm section 72. It is here noted that once repairs or other service is finished, the operation of the reel may be resumed with the result that the released pin 100 will be automatically returned to its extended latch position once the outer arm hole 80 again becomes aligned with the pin cup 104.

The operation of the invention is briefly stated as follows. Assuming the mower conditioner 10 to be under tow by a prime mover, such as a tractor, in normal operation mowing and windrowing a crop, a drive coupling to the prime mover will be engaged for causing reciprocation of the sickle of the cutterbar 44 and for causing rotation of the reel 50. The toothbar guide arm 64 will be in its normal operating condition wherein the latch pins 100 are received in the holes 80 provided in the outer arm sections 72 so that the inner and outer arm sections 70 and 72 move in unison like the single-piece guide arms 63. The cam track 68 at the left end of the reel 50 will guide the rollers 66 carried by the arms 63 and the outer arm sections 72 of the arms 64 so that the toothbars 60 and the respective sets of teeth 62 carried thereby will be caused to oscillate such as to position the teeth 62 properly for moving standing crop against the cutterbar 44 and then move the cut crop into the nip of the conditioner rolls 46 and 48, which at this point will be counter rotated relative to each other so as to feed crop rearwardly therebetween.

In the event that service to the cutterbar 44 becomes necessary, power for driving the mower conditioner will be disengaged when the reel 50 is in a position with the arm 64 and its associated toothbar 60 being located at the bottom of the reel. The operator may then pivot or swing the teeth 62 carried by this toothbar away from the cutterbar 44 to provide access for servicing the cutterbar by first grasping and pulling the roll pin 108 to effect release of the latch pin 100 from the hole 80 of the arm section 72 and then by pivoting the inner arm section 70 relative to the outer arm section 72 to effect rotation of the attached toothbar 60 and associated teeth 62. Movement of the inner arm section 70 relative to an associated outer arm section 72 will result in the cup 104 of the pin 100 engaging the arcuate portion 110 of the outer arm section so that it remains retracted so long as the pin 100 and hole 80 are misaligned. Once the repair or service is completed, the operator may once again engage the drives to the mower conditioner with the result that the reel 50 will rotate so as to cause the outer arm section 72 to be pivoted relative to the inner arm section 70 to once again bring the hole 80 into alignment with the retracted pin 100 whereupon the spring 106 will automatically extend the pin into the hole 80 to once again establish the working condition of the arm 64 wherein its inner and outer arm sections 70 and 72, respectively, move in unison.

We claim:

1. In a harvester header comprising a frame having opposite upright side structures, a cutterbar extending between and being connected to opposite lower locations of the upright side structures, a reel including a central axle having opposite ends rotatably supported in the opposite upright side structures at respective locations above and forwardly of the cutterbar, said reel including at least two spider structures fixed for rotation with the axle at transversely spaced locations therealong, a plurality of equiangularly spaced toothbars rotatably supported in the spider structures at locations spaced equidistant from the axle, each toothbar having a plurality of teeth supported thereby for rotation therewith, a toothbar guide arm extending radially relatively to and being fixed to an end of each toothbar and carrying a roller at an end thereof, an inwardly opening endless cam track being fixed to an inner side of that side structure closest to the guide arms, and the roller of each toothbar guide arm being received in the cam track so that as the reel is rotated the cam track causes the toothbar guide arms to oscillate their associated toothbars so that the teeth are presented in the correct attitude for effectively sweeping standing crop against the cutterbar and then for sweeping the cut crop rearwardly from the cutterbar, the improvement comprising: at least one toothbar guide arm including an inner arm section having an end fixed to said toothbar and an outer arm section mounted for pivoting relative to said inner arm section and carrying a respective one of the rollers; and a releasable connector acting between the inner and outer arm sections and normally preventing relative movement therebetween but being selectively releasable to permit the inner arm section together with an associated toothbar to be manually pivoted to thereby pivot the teeth, associated with the latter toothbar, away from a work zone adjacent the cutterbar to permit access to perform service or repair work on the cutterbar.

2. The header defined in claim 1 wherein the pivotal connection of the outer arm section to the inner arm section of said at least one toothbar guide arm is established by a mounting pin fixed to the outer arm section and rotatably received in the end of the associated toothbar.

3. The header defined in claim 1 wherein the releasable connector comprises a spring-loaded latch pin assembly carried by the inner arm section and including a latch pin releasably received in a hole provided in the outer arm section.

4. The header defined in claim 3 wherein said inner and outer arm sections are disposed one against the other; a second hole being provided in said inner arm section in axial alignment with the hole located in the outer arm section; said spring loaded latch pin assembly including a U-shaped bracket joined to an inner surface location of the inner arm section so that the legs are on opposite sides of said second hole and a web of said bracket is spaced inwardly from said second hole; said latch pin including a stem extending through said second hole and into the hole provided in the outer arm section; a spring abutment carried by an end of the stem; a coil compression spring located on the stem between the abutment and the bracket web and normally acting to keep the stem located in the hole provided in the outer arm section.

5. The header defined in claim 4 wherein said latch pin includes a cylindrical cup receiving said stem and having a bottom wall fixed to said latch pin and defining said abutment; and said hole in the outer arm section and said second hole being sized to snugly receive said cup.

6. The header defined in claim 4 wherein the pivotal connection between the inner and outer arm sections comprises a mounting pin fixed to the outer arm section and pivotally received in the end of the associated toothbar.

7. The header defined in claim 6 wherein said inner arm section is provided with a portion dimensioned so as to be at least as far as the latch pin is from said mounting pin whereby said portion acts to keep the latch pin in its released position when the latch pin is withdrawn from the hole in said outer arm section and the inner arm section is together with the associated toothbar is rotated relative to the outer arm section.

8. The header defined in claim 2 wherein said outer arm section includes a retainer strap extending to an inside surface of said inner arm section whereby outward movement of said outer arm relative to said toothbar is limited to prevent the mounting pin from being withdrawn from the toothbar.

9. The header defined in claim 8 wherein said retainer strap has spaced upper and lower end portions fixed to and extending inwardly from a leading surface of said outer arm section, as considered with the reel rotating to sweep crop toward the cutterbar, and an intermediate portion disposed in inwardly spaced parallel relationship to a remaining portion of the outer arm section with the intermediate portion and remaining portion of the arm section being disposed on opposite sides of the inner arm section.

* * * * *